(12) United States Patent
Deng et al.

(10) Patent No.: US 9,544,440 B2
(45) Date of Patent: Jan. 10, 2017

(54) METHOD TO VERIFY TELEPHONE NUMBER

(75) Inventors: Hui Deng, San Ramon, CA (US);
Jianming Tu, Shanghai (CN); Dongren Chen, Shanghai (CN)

(73) Assignee: ArcSoft (Shanghai) Technology Company, LTD, Shanghai (CN)

( * ) Notice: Subject to any disclaimer, the term of this patent is extended or adjusted under 35 U.S.C. 154(b) by 1598 days.

(21) Appl. No.: 12/811,076

(22) PCT Filed: Dec. 28, 2007

(86) PCT No.: PCT/US2007/089148
§ 371 (c)(1),
(2), (4) Date: Oct. 11, 2010

(87) PCT Pub. No.: WO2009/085052
PCT Pub. Date: Jul. 9, 2009

(65) Prior Publication Data
US 2011/0019807 A1    Jan. 27, 2011

(51) Int. Cl.
*H04M 15/06* (2006.01)
*H04M 7/00* (2006.01)
*H04L 29/06* (2006.01)

(52) U.S. Cl.
CPC .......... *H04M 7/0078* (2013.01); *H04L 63/126* (2013.01)

(58) Field of Classification Search
USPC ............... 379/142.01–142.18, 88.21, 280
See application file for complete search history.

(56) References Cited

U.S. PATENT DOCUMENTS

| | | | |
|---|---|---|---|
| 5,341,414 A | 8/1994 | Popke | |
| 5,857,011 A * | 1/1999 | Kennedy et al. | ........... 379/29.06 |
| 6,201,854 B1 | 3/2001 | Avitsur et al. | |
| 8,331,538 B2 * | 12/2012 | Tighe | ........................ 379/29.06 |
| 2004/0120487 A1 | 6/2004 | Cockrell et al. | |
| 2006/0276196 A1 | 12/2006 | Jiang et al. | |
| 2007/0036319 A1 * | 2/2007 | Tighe | ...................... 379/202.01 |
| 2007/0147356 A1 * | 6/2007 | Malas et al. | ................... 370/356 |
| 2012/0069774 A1 * | 3/2012 | DuPertuis et al. | ............. 370/259 |

OTHER PUBLICATIONS

PCT/US2007/89148, International Search Report and Written Opinion, 8 pages.

* cited by examiner

*Primary Examiner* — Yosef K Laekemariam
(74) *Attorney, Agent, or Firm* — Patent Law Group LLP; David C. Hsia

(57) ABSTRACT

A method for an authentication server to authenticate Voice over Internet Protocol (VoIP) devices includes receiving a request from a unverified VoIP device to verify its global telephone number over a computer network, searching for verified VoIP devices that have authenticated identities and caller ID service, and providing the telephone numbers of the verified VoIP devices to the unverified VoIP device, wherein the unverified VoIP device calls the verified VoIP devices and the verified VoIP devices detect telephone numbers of the unverified VoIP device. The method further comprises receiving the detected telephone numbers from the verified VoIP devices and determining if the detected telephone numbers match a telephone number provided by the unverified VoIP device, wherein the unverified VoIP device becomes verified if the telephone numbers match the telephone number provided by the VoIP device.

11 Claims, 3 Drawing Sheets

US 9,544,440 B2

METHOD TO VERIFY TELEPHONE NUMBER

CROSS REFERENCE TO RELATED APPLICATIONS

This application is related to U.S. application Ser. No. 11/618,739, entitled "Determining Pairings of Telephone Numbers and IP Addresses from Caching and Peer-to-Peer Lookup," and U.S. application Ser. No. 11/618,740, entitled "Regional Service by Phone," which are commonly assigned and incorporated herein by reference.

FIELD OF INVENTION

This invention relates to a method for verifying telephone numbers of a device.

DESCRIPTION OF RELATED ART

Some Voice over Internet Protocol (VoIP) systems uses IP addresses to identify and locate VoIP clients. Some VoIP systems use global telephone numbers to identify and locate VoIP clients but this requires the VoIP system to be connected to a public switched telephone network (PSTN) to verify the global telephone numbers provided by the VoIP clients. When a VoIP system is not connected to the PSTN but still wishes to identify VoIP clients by global telephone numbers, it needs a method to verify the global telephone numbers provided by the VoIP clients. There are two conventional methods to verify the PSTN telephone number.

In a first method, the service provider establishes a toll free number and a server computer to verify a global telephone number provided by a VoIP client. The VoIP client calls the toll-free number and caller ID (CID) is used to verify the calling number against the number provided by the VoIP client. While this method can verify the global telephone number provided by the VoIP client, it is costly for the service provider to establish such a toll free number and it may be costly to the VoIP client when it is located outside the calling region of the toll free number.

In a second method, a VoIP client that needs to be verified calls another VoIP client that has already been verified. The verified VoIP client uses its CID to verify the telephone number of the unverified VoIP client and to inform the server computer of the service provider. While this can save the telephone cost, security can be compromised if the unverified VoIP client and the verified VoIP client conspire to circumvent the system.

SUMMARY

In one embodiment of the invention, a method for an authentication server to verify Voice over Internet Protocol (VoIP) devices includes the authentication server receiving a request from an unverified VoIP device to verify its identity over a computer network, searching for verified VoIP devices that have verified identities and caller ID service, and providing the telephone numbers of the verified VoIP devices to the unverified VoIP device, wherein the unverified VoIP device calls the verified VoIP devices and the verified VoIP devices detect telephone numbers of the unverified VoIP device from the caller ID service. The method further includes the authentication server receiving the detected telephone numbers from the verified VoIP devices and determining if the detected telephone numbers match a telephone number provided by the unverified VoIP device, wherein the unverified VoIP device becomes verified if the telephone numbers match the telephone number provided by the VoIP device.

BRIEF DESCRIPTION OF THE DRAWINGS

Use of the same reference numbers in different figures indicates similar or identical elements.

DETAILED DESCRIPTION OF THE INVENTION

Figure 1:
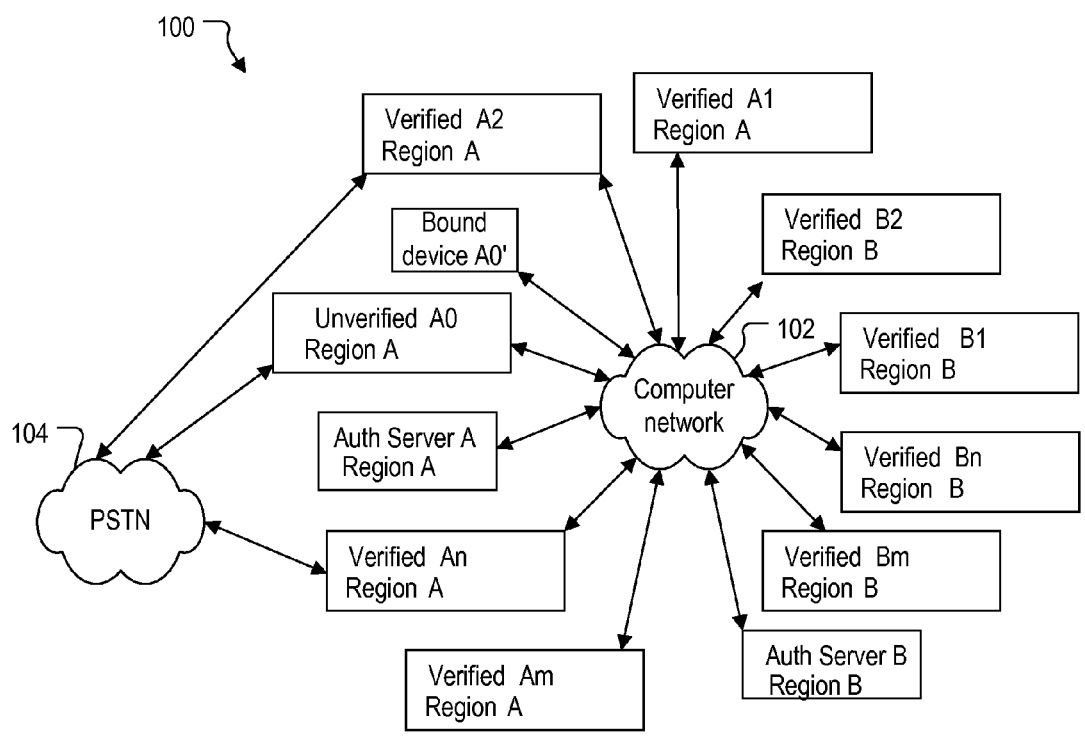
FIG. 1 illustrates a system for verifying the identity of a device using its telephone number in one embodiment of the invention.

FIG. 1 illustrates a system 100 that verifies a global telephone number provided by a device in one embodiment of the invention. System 100 includes an authentication server computer A in a region A, a VoIP client device A0 in region A that needs to verify its global telephone number with an authentication server, and VoIP client devices A1, A2 ... Am, and An in region A that already have their global telephone numbers verified with authentication server A. Note that a region can be geographic (e.g., a city, a regional area, a state, or a country) or based on telephone service (e.g., a local toll-free area or a local toll area). Authentication server A and VoIP clients A0, A1, A2 ... Am, and An are connected to a computer network 102 (e.g., an IP network such as the Internet). VoIP clients A0, A2, and An are also connected to a public switched telephone network (PSTN) 104 either directly through a circuit switched channel (e.g., a landline) or indirectly through a packet switched channel (e.g., a VoIP line over computer network 102).

System 100 further includes an authentication server computer B in a region B and VoIP client devices B1, B2 ... Bm, and Bn in region B that are similarly constructed as the devices in region A. Although not shown, VoIP clients B2 and Bn are connected to the PSTN. In one embodiment, VoIP clients A0, A1, A2 ... Am, An, B1, B2 are VoIP client devices similar to those described in U.S. application Ser. No. 11/618,740, entitled "Regional Service by Phone," which is commonly assigned and incorporated herein by reference.

Figure 2A:
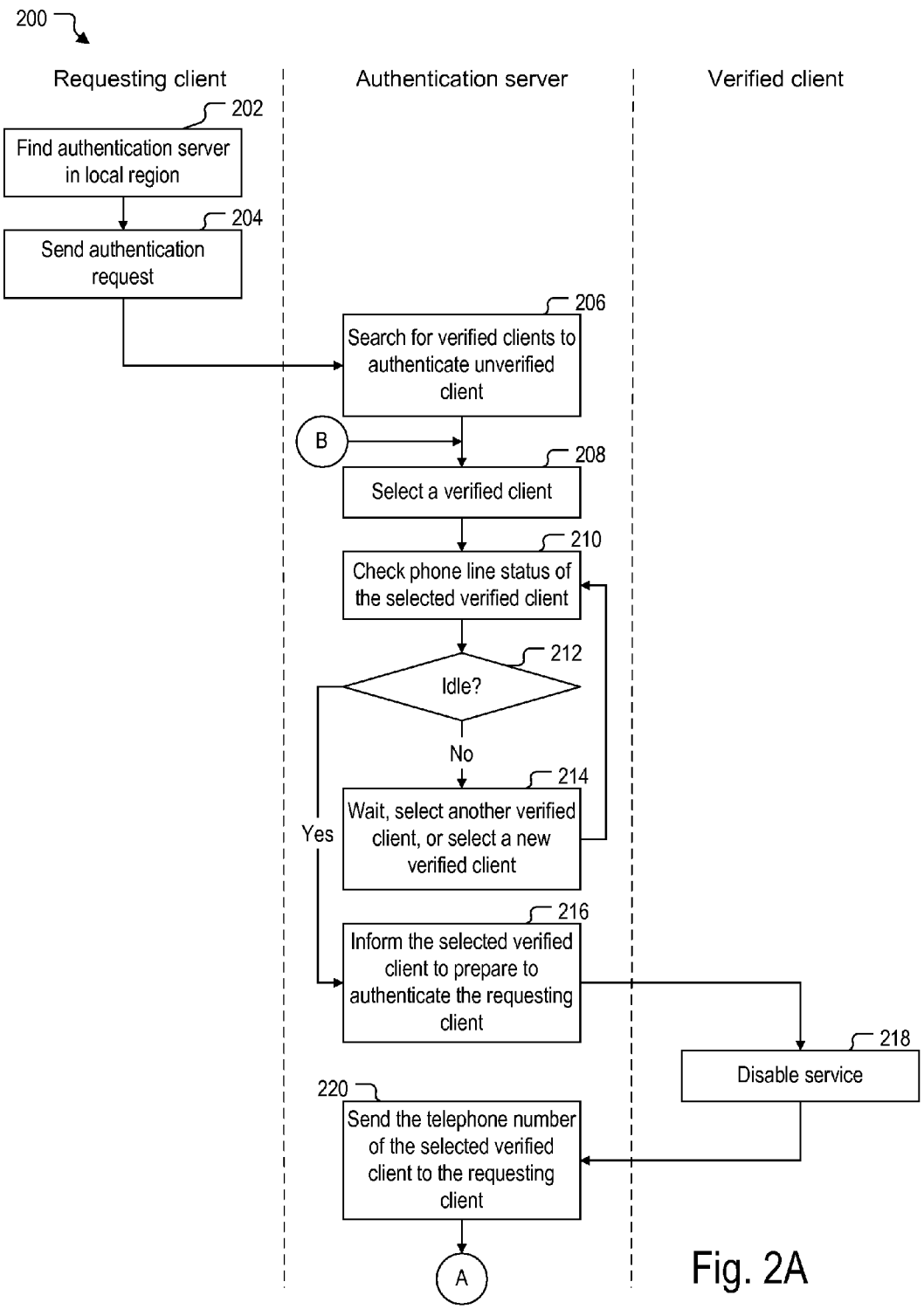
FIGS. 2A and 2B are a flowchart of a method for the system of FIG. 1 to verify the identity of a device using its telephone number in one embodiment of the invention.
Figure 2B:
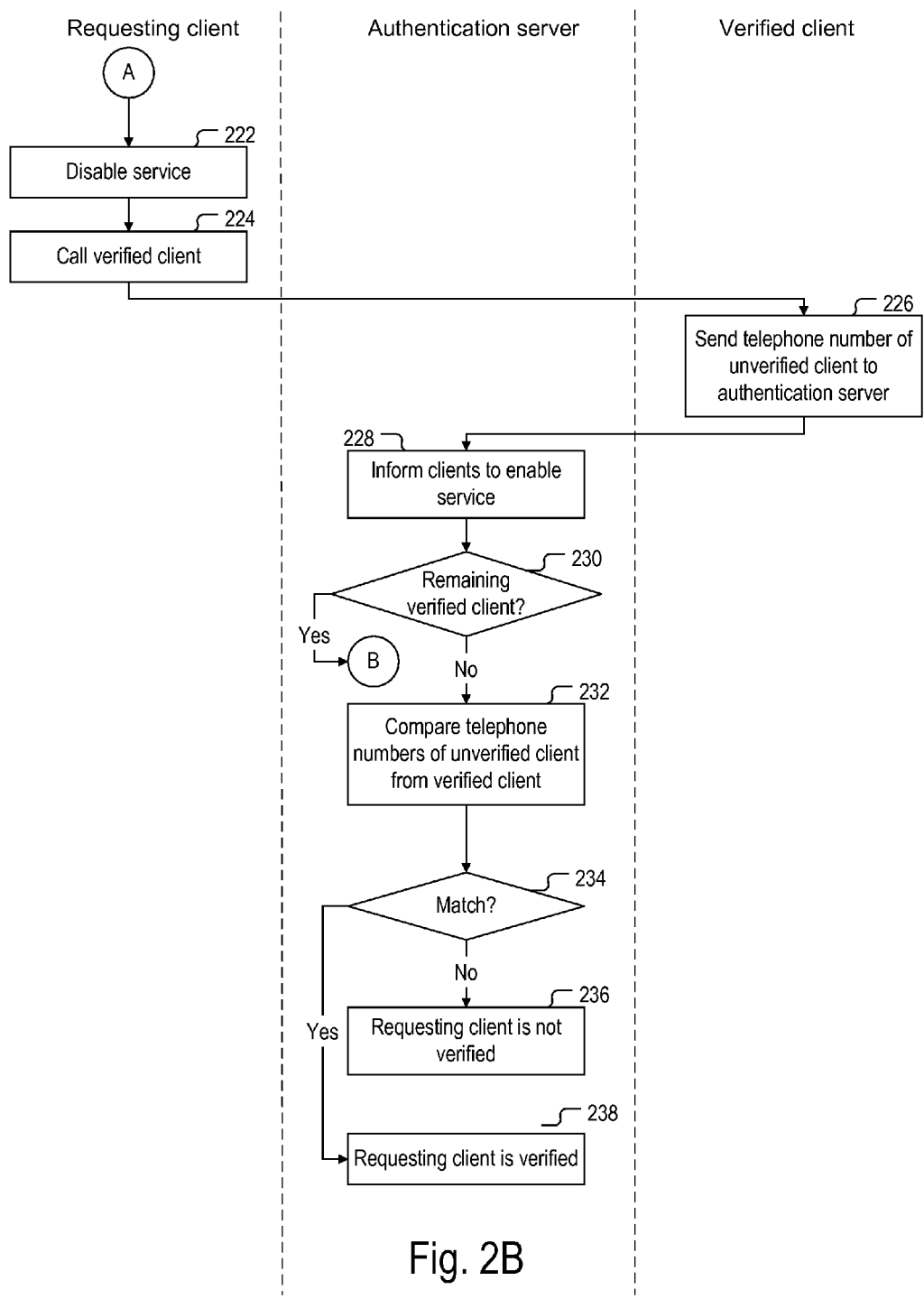

FIGS. 2A and 2B illustrate a method 200 for system 100 to verify the global telephone number provided by VoIP client A0 (FIG. 1) in one embodiment of the invention.

In step 202 (FIG. 2A), VoIP client A0 finds an authentication server to verify its global telephone number. In one embodiment, VoIP client A0 finds an authentication server that is located in the same region as itself (e.g., authentication server A in region A). To do this, VoIP client A0 joins a peer-to-peer (P2P) network of similar devices over computer network 102, joins a subgroup in the PSP network that is based on its geographic location, and searches for an authentication server in the subgroup. For more information related to joining P2P network and subgroup, please refer to U.S. application Ser. No. 11/618,739, entitled "Determining Pairings of Telephone Numbers and IP Addresses from Caching and Peer-to-Peer Lookup," which is commonly assigned and incorporated herein by reference. Authentication server A can be a dedicated device or a peer device selected from the subgroup.

In another embodiment, VoIP client A0 finds an authentication server that serves multiple regions. To do this, VoIP client A0 finds the authentication server through a known website on compute network 102. For demonstrating this method, assume that authentication server A serves multiple regions including region A where VoIP client A0 is located.

In step 204, VoIP client A0 sends a request to verify its global telephone number to authentication server A over computer network 102. In the request, VoIP client A0 includes its global telephone number.

In step 206, authentication server A selects verified VoIP clients with CID service that will be used to verify VoIP client A0. Note that at the very beginning of implementing system 100, authentication server A has to designate a number of verified VoIP clients until there are enough VoIP clients verified through method 200.

If authentication server A serves only one region, then it assumes VoIP client A0 is located in the same region as itself. If authentication server A serves multiple regions, it needs to first determine which region VoIP client A0 is located in. Authentication server A determines the region based on the IP address of VoIP client A0 in the IP packet of the authentication request. Alternatively, authentication server A determines the region of VoIP client A0 based on its purported global telephone number.

There are two methods for authentication server A to select the verified devices. In the first method, authentication server A randomly selects a number of verified VoIP clients located in region A from a list of VoIP clients that have previously verified their global telephone numbers with authentication server A. For example, authentication server A selects devices A2 and An in region A.

The first method is able to authenticate a VoIP client A0 that does not have the ability to call outside of its region. However, the security level is low since it is easier for VoIP client A0 to conspire with verified VoIP clients within the same region to circumvent the authentication. This is especially true when there are few verified VoIP clients in a region because it becomes easier for VoIP client A0 to control the client verified devices and the selection of the verified VoIP clients is less random.

In the second method, authentication server A randomly selects a number of verified VoIP clients in a larger region (e.g., consisting of multiple smaller regions). For example, authentication server A selects verified VoIP clients A2 and An in region A, and verified VoIP clients B2 and Bn in nearby region B.

There are several ways for authentication server A to randomly select verified VoIP clients in other regions. First, there may be a central server that all the authentication servers communicate with to receive information about verified VoIP clients in the other regions. Second, the authentication servers can form a server group that selects a node in the group that acts as the central server. Third, the VoIP clients in all the regions can form a client group that selects a node in the group that acts as the central server. Authentication server A requests the central server, the server group, or the client group for a list of verified VoIP clients in the different regions or a list of randomly selected verified VoIP clients in the different regions.

By using verified VoIP clients in a larger area, it is harder for VoIP client A0 to conspire with verified VoIP clients to circumvent the authentication. However, this method cannot be used to authenticate a VoIP client A0 that cannot dial outside of its region (e.g., a VoIP client A0 that only has local telephone service and cannot call long distance so it cannot reach VoIP clients in other regions).

In step 208, authentication server A selects one of the verified VoIP clients found in step 206 (e.g., device A2).

In step 210, authentication server A checks the phone line status of the verified VoIP client. Authentication server A does this by requesting and receiving the phone line status of the verified VoIP client over computer network 102.

In step 212, authentication server A determines if the phone line of the verified VoIP client is idle. If not, then step 212 is followed by step 214. If the phone line of the verified VoIP client is idle, then step 212 is followed by step 216.

In step 214, authentication server A can allow VoIP client A0 to wait for the verified VoIP client to become available, select another verified VoIP client from step 206, or search for a new verified VoIP client in step 206. Step 214 is followed by step 210.

In step 216, authentication server A instructs the verified VoIP client to prepare to authenticate VoIP client A0 at an agreed upon time over computer network 102.

In step 218, the verified VoIP client temporarily disables its service to its local user, and prepares to receive a call from VoIP client A0 at the agreed upon time. Specifically, the verified VoIP client removes the hook and ring so its local user cannot dial out.

In step 220, authentication server A informs VoIP client A0 the telephone number of the verified VoIP client over computer network 102.

In step 222 (FIG. 2B), VoIP client A0 disables it service to its local user and calls the selected verified device at the agreed upon time. Specifically, VoIP client A0 removes the hook and ring so its local user cannot dial out.

In step 224, VoIP client A0 calls the verified VoIP client either directly or indirectly through PSTN 104. In response, the verified VoIP client determines the telephone number of VoIP client A0 using its CID service.

In step 226, the verified VoIP client sends the telephone number of VoIP client A0 to authentication server A over computer network 102.

In step 228, authentication sever A informs VoIP client A0 and the verified VoIP client that the authentication process is finished and that they can enable services to their local users.

In step 230, authentication server A determines if all the verified VoIP clients found in step 206 have been used to authenticate VoIP client A0. If so, then step 230 is followed by step 232. Otherwise step 230 loops back to step 208.

In step 232, authentication server A compares the telephone numbers of VoIP client A0 it received from the verified VoIP clients found in step 206.

In step 234, authentication server A determines if the telephone numbers match. If not, then step 234 is followed by step 236 where authentication server A determines that the global telephone number of VoIP client A0 is not verified and sending a message over computer network 102 to VoIP client A0 that its telephone has not been verified. If all or a majority of the telephone numbers match, then step 234 is followed by step 238 where authentication server A determines that the global telephone number of VoIP client A0 has been authenticated and sending a message over computer network 102 to VoIP client A0 that its telephone has been verified.

In one embodiment, a device such as a TV set-top boxes or a portable media player can be integrated with device A0, connected by network or USB to device A0. The device then can be identified by the global telephone number of device A0.

Various other adaptations and combinations of features of the embodiments disclosed are within the scope of the invention. Numerous embodiments are encompassed by the following claims.

The invention claimed is:

1. A method for an authentication server to verify a telephone number of a Voice over Internet Protocol (VoIP) device, comprising:
   receiving over a computer network a request from the VoIP device to verify its telephone number, the request including the telephone number, the VoIP device being coupled to the computer network and a telephone network;
   searching for verified VoIP devices that have verified their telephone numbers, the verified VoIP devices being coupled to the computer network and the telephone network, the verified VoIP devices having caller ID service;
   sending over the computer network the telephone numbers of the verified VoIP devices to the VoIP device, wherein the VoIP device calls the verified VoIP devices and the verified VoIP devices use the caller ID service to detect telephone numbers of the VoIP device;
   receiving over the computer network the detected telephone numbers of the VoIP device from the verified VoIP devices; and
   determining if the detected telephone numbers match the telephone number provided by the VoIP device in the request, wherein the telephone number provided by the VoIP device is verified if a substantial number of the detected telephone numbers match the telephone number provided by the VoIP device.

2. The method of claim 1, wherein said searching for verified VoIP devices that have verified their telephone numbers comprises searching for verified VoIP devices located in a local region of the VoIP device.

3. The method of claim 2, wherein said searching for verified VoIP devices that have verified their telephone numbers further comprises searching for verified VoIP devices located in a region outside of the local region.

4. The method of claim 3, wherein said searching for verified VoIP devices located in a region outside of the local region comprises requesting from a central server for a list of verified VoIP devices in the region outside of the local region of the VoIP device.

5. The method of claim 1, further comprising:
   sending over the computer network an instruction to one of the verified VoIP devices to prepare to receive a telephone call from the VoIP device, wherein the verified VoIP device temporarily disables telephone service to its user.

6. The method of claim 5, further comprising, prior to said sending over the computer network an instruction to one of the verified VoIP devices to prepare to receive a telephone call from the VoIP device:
   sending over the computer network a request for a telephone line status to the verified VoIP device; and
   wherein said sending over the computer network an instruction to one of the verified VoIP device to prepare to receive a telephone call from the VoIP device occurs after receiving a response from the verified VoIP device that the telephone line status is idle.

7. The method of claim 5, further comprising sending over the computer network a message indicating whether or not the telephone number is verified to the VoIP device.

8. A method for a Voice over Internet Protocol (VoIP) device to verify its telephone number with an authentication server, the VoIP device being coupled to a computer network and a telephone network, the method comprising:
   sending over a computer network a request to verify the telephone number to the authentication server, the request including the telephone number;
   receiving over the computer network telephone numbers of verified VoIP devices from the authentication server; and
   calling over the telephone network the verified VoIP devices, wherein the verified VoIP devices use caller ID service to detect telephone numbers of the VoIP device and provides the detected telephone numbers to the authentication server to determine if the detected telephone numbers match the telephone number.

9. The method of claim 8, wherein at least some of the verified VoIP devices are located in a local region of the VoIP device.

10. The method of claim 9, wherein at least some of the VoIP devices are located in a region outside of the local region.

11. The method of claim 8, further comprising receiving over the computer network a message indicating whether or not the telephone number is verified from the authentication server.

* * * * *